3,519,425
VESICULAR COMPOSITIONS AND PHOTOGRAPHIC ELEMENTS CONTAINING 2-AZIDO-1,4-QUINONES
Akemi S. Marshall, William J. Priest, and James A. Van Allan, Rochester, N.Y., assignors to Eastman Kodak Company, Rochester, N.Y., a corporation of New Jersey
No Drawing. Filed Aug. 2, 1967, Ser. No. 657,773
Int. Cl. G03c 1/52
U.S. Cl. 96—91        12 Claims

ABSTRACT OF THE DISCLOSURE

Light-sensitive 2-azido-1,4-quinones are useful as the gas-forming agent in vesicular compositions and vesicular photographic elements which are sensitive to both visible and ultraviolet light.

---

This invention relates to photography, and more particularly, is concerned with vesicular compositions and with photographic elements utilizing such vesicular compositions.

As is well known, vesicular compositions essentially comprise a gas-forming or photoblowing agent substantially uniformly dispersed in a thermoplastic matrix. The photoblowing agent is a compound which, on exposure to suitable radiation, especially ultraviolet radiation, decomposes with an associated formation of gas. The most common photoblowing agents are those which have a diazo group (—N≡N⊕) or an azido group (—N$_3$) and which release small nitrogen gas bubbles on decomposition.

It is known in the art to use vesicular compositions as duplicating media, particularly in the production of contact prints. Such prints are prepared by imagewise exposing the vesicular element, through the original to be duplicated, to a source of suitable radiation, typically actinic radiation. The gas-forming or photoblowing agent which is present in the radiation-exposed areas of the vesicular element decomposes, forming gas molecules. Subsequently, the exposed vesicular element is heated to soften the polymer matrix and to allow the gas molecules to coalesce and expand to form small bubbles in the matrix. These bubbles, by virtue of their light-scattering properties, produce a visible image corresponding to the image of the original subject matter.

Most known photoblowing agents are sensitive to only ultraviolet light. Such restricted spectral sensitivity precludes the use of more conventional and inexpensive light sources, such as fluorescent or incandescent lights which emit little or no ultraviolet radiation. Moreover, vesicular compositions containing such typical photoblowing agents cannot be used to duplicate subject matter on certain paper stocks. For example, some paper stocks scatter shorter wavelength radiation, and many papers contain optical whiteners which also function as ultraviolet light absorbers, thus making such paper stocks opaque to ultraviolet light. In either instance, vesicular compositions sensitive to only ultraviolet light are not suitably employed to duplicate the original.

Accordingly, it is an object of this invention to provide novel vesicular compositions containing a photoblowing agent which is sensitive to visible radiation.

Still another object of the present invention is to provide vesicular photographic elements which are sensitive to visible light.

Yet an additional object of the instant invention is to provide photoblowing agents, vesicular compositions and vesicular photographic elements which are sensitive to selected visible wavelengths.

Additional objects of the present invention will become obvious from a consideration of the following specification and appended claims.

These and other objects of the present invention are accomplished with light-sensitive vesicular compositions which comprise a thermoplastic polymeric matrix having substantially uniformly dispersed therein an image-forming amount of a 2-azido-1,4-quinone.

2-azido-1,4-quinones are sensitive to visible light in the blue region of the spectrum, and more particularly, a range of from about 400 to about 500 m$\mu$, as well as to ultraviolet or near ultraviolet radiation. They are not, however, sensitive to longer wavelengths, particularly in the yellow or red regions of the spectrum. Thus, vesicular compositions containing these compounds can be exposed under an incandescent or fluorescent light which emits visible light having a wavelength in the 400 to 500 m$\mu$ range, permitting copying of originals printed on stocks such as those containing ultraviolet absorbers which heretofore were not amenable to duplication. Additionally, the vesicular compositions of the present invention can be handled under yellow or red light without danger of photoactivating exposure.

Advantageous 2-azido-1,4-quinones include those represented by the formula:

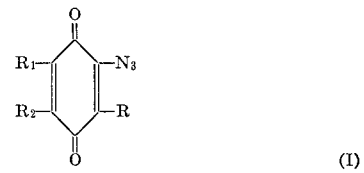

(I)

wherein R represents either a hydrogen atom, a halogen atom such as bromine and chlorine or an azido radical; each of $R_1$ and $R_2$ represents either hydrogen or a monovalent organic substituent such as a halogen atoms (iodine or chlorine for example), an azido radical, an alkyl radical typically having from 1 to about 15 carbon atoms (methyl, phenethyl, propyl, isobutyl, benzyl, octyl, decyl, tetradecyl and pentadecyl for example), an alkoxy radical having from 1 to about 15 carbon atoms (methoxy, ethoxy, isopropoxy, butoxy, heptoxy, dodecoxy and the like radicals), an aryl radical such as phenyl and napthyl and including substituted aryl radicals such as alkyl-substituted aryl radicals like tolyl, xylyl and mesityl, an aryloxy radical such as phenoxy, an arylthio radical such as phenylthio and a sulfo radical including alkali metal sulfo radicals; and also, $R_1$ and $R_2$, when taken together, form a divalent organic radical, preferably one which, when taken with the benzoquinone nucleus of Formula I, forms a 6-membered carbocyclic fused ring which can be unsubstituted or substituted with one or more of the monovalent substituents represented by $R_1$ or $R_2$.

Preferred azidoquinones within the scope of Formula I include the benzoquinones and napthoquinones which have the formula:

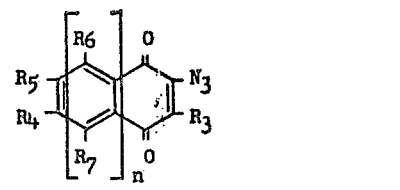

(II)

wherein $R_3$ represents either a halogen atom such as chlorine and iodine or an azido radical; $n$ is an integer having a value of 0 or 1; and each of $R_4$, $R_5$, $R_6$ and $R_7$ represents either a hydrogen atom, an alkyl radical as described for R, an alkoxy radical as described for R, an aryl or aryloxy radical as described for R, a sulfo radical including alkali metal sulfo radicals as described for R or, when $n$ is 0, they also represent a halogen atom such as chlorine and bromine or an azido radical.

Particularly preferred azidoquinones as described by Formula II are those wherein $R_3$, when a halogen atom, is chlorine and any of $R_4$ to $R_7$ is either a hydrogen atom or a lower alkyl radical, especially methyl.

It is to be emphasized that the suitability of these compounds is due to the 2-azido-1,4-quinoid structure. Thus, the presence or absence of particular additional substituents can be widely varied. It will, however, be recognized by those of ordinary skill in this art that certain substituents are undesirable in that they can cause the azido quinone to be incompatible with the matrix polymer, interfere with the photolytic decomposition, cause undesirable coloration of the vesicular composition and the like. Undesirable for this use are groups (for example azo, azine and azomethine groups) which of themselves, absorb light in the same spectral range as does the quinone. Also undesirable are groups which tend to limit solubility in the matrix polymer. The groups chosen should be in harmony with the hydrophobic or hydrophilic nature of the particular polymers. Salt-forming groups, such as sulfo, would be desirable with hydrophilic polymers but not with hydrophobic polymers. Groups containing large numbers of fused rings would be objectionable because azidoquinones containing them would be insoluble in either type of polymer. Thus, the compounds represented by Formulas I and II, while representing particularly preferred 2-azido-1,4-quinones, are not exclusive of other compounds which may be employed within the spirit of this invention.

Typical 2-azido-1,4-quinones that can be used in the invention include:

2,3-diazido-1,4-naphthoquinone,
2-azido-3-chloro-1,4-naphthoquinone,
2-azido-3-chloro-5,6-dimethylbenzoquinone,
2,3-diazido-6,7-dimethyl-1,4-naphthoquinone,
2,3-diazido-5-nitro-1,4-naphthoquinone,
2,3-diazido-1,4-naphthoquinone-6-sulfonic acid sodium salt,
2,3-diazido-5-butoxybenzoquinone,
2,3-diazido-5,6-dimethoxybenzoquinone,
2,5-diazido-3,6-dichlorobenzoquinone,
2,3-diazido-5-phenylbenzoquinone,
2-azido-3-chloro-5-phenylthiobenzoquinone,
2,3-diazido-5-phenyloxybenzoquinone,
2,3-diazidobenzoquinone-5-sulfonic acid,
2,3-diazido-5,6-diethylbenzoquinone,
2,3-diazido-1,4-naphthoquinone-6-sulfonic acid,
2-azido-3-chloro-7-methoxy-1,4-naphthoquinone,
2,3-diazido-5,7-diethoxy-1,4-naphthoquinone,
2,3-diazido-6-phenyl-1,4-naphthoquinone,
2,3-diazido-6-phenoxy-1,4-naphthoquinone, and
2,3-diazido-6-phenylthio-1,4-naphthoquinone.

The compounds which are employed in accordance with this invention are generally know compounds, or can be produced from known compounds by generally known compounds by generally known techniques. They can all be prepared readily from 2- or 2,3-unsubstituted-1,4-quinones by a two-step process of halogenation followed by reaction with sodium azide.

Halogenation, e.g., chlorination, is effected by reaction of the 1,4-quinone with chlorine in the presence of acetic acid and iodine at elevated temperature, e.g., about 100° C., and atmospheric pressure. Chlorine is introduced into the 1,4-quinone at any unsubstituted position adjacent a carbonyl. Thus, 1,4-benzoquinone is converted to chloranil, 1,4-naphthoquinone is converted to 2,3-dichloro-1,4-naphthoquinone and the like.

The chloroquinone is converted to an azidoquinone by reaction at room temperature with sodium azide in an organic solvent such as methanol or dimethylformamide or in aqueous mixtures of these solvents. One or more of the chlorine atoms is replaced by an azido group, depending upon the molar ratio of sodium azide and chloroquinone and also depending upon reaction rate factors.

Substituted quinones can be obtained by any of several procedures. For example, 1,4-naphthoquinone or derivatives thereof which are substituted on the 5-, 6-, 7- and/or 8-positions are readily obtained by a Diels-Alder addition of butadiene or a derivative thereof to benzoquinone.

The composition of the polymeric matrix of the vesicular compositions of this invention are subject to wide variation. The requirements for the matrix are known to the art and include thermoplasticity, sufficient impermeability to nitrogen gas to prevent undue loss of the gas before development of the image and the like. Matrix compositions which are known to be suitable include polystyrene; poly(vinyl chloride); poly(vinylidene chloride); copolymers of vinyl chloride or vinylidene chloride with vinyl monomer such as acrylonitrile, acrylic acid, methyl acrylate, methyl methacrylate, diethyl maleate, vinyl acetate, vinyl alcohol and the like; and also copolymers of styrene with acrylonitrile and the like. The matrix can be a single polymer or a mixture of two or more polymers.

The amount of azidoquinone which is present in the vesicular composition is also susceptible of wide variation, provided there is at least an image-forming amount, i.e., an amount sufficient to provide a visible image after exposure and development. In general, the image-forming amount will be in the range of from about 2 to about 20 weight percent, and preferably from about 2 to 10 percent, based upon the total weight of the photo-blowing agent and the matrix polymer.

Photographic elements incorporating the vesicular compositions described herein are typically prepared by coating a support with such a vesicular compostion. The technique of coating can be any suitable method known to those skilled in the art, but typically hopper coating and doctor blade coating are employed.

In like fashion, the choice of a support material can be widely varied and include such conventional polymeric photographic film supports as cellulose acetate, cellulose nitrate, cellulose acetate butyrate, cellulose butyrate, polystyrene and poly(ethylene terephthalate). Paper, including polyethylene-coated and polypropylene-coated paper, is also a common suppport material.

A photographic element which is so prepared can be exposed to a source of light radiation, preferably having a good intensity in the 400 to 500 m$\mu$ range, and then heat developed to produce a vesicular image. Heating can be accomplished by a wide selection of means, but typically a hot roll vesicular processing machine is employed. To increase the speed of such photographic elements as are described herein, they can be subjected to a preliminary overall exposure to produce nuclei which provide an increase in specular optical density of from about 0.03 to about 0.5 density units, when developed, over the unexposed composition, which exposure is followed by heating and then storing at about 0° to 35° C. for at least 12 hours.

The invention is further illustrated by the following examples which include preferred embodiments thereof.

EXAMPLE 1

A suspension of 0.1 gram of 2,3-diazido-1,4-naphthoquinone in 1.0 gram of tetrahydrofuran is added to a solution of 2.7 grams of "Saran F220" (an 80/20 vinylidene chloride/acrylonitrile copolymer marketed by Dow Chemical Company) and 0.3 gram of "Lucite 41" (a poly[methyl methacrylate] marketed by Du Pont) in 7.0 grams of tetrahydrofuran, and the resulting mixture is stirred at room temperature until all the azide has dissolved. To produce a photographic element, the solution is coated on a poly(ethylene terephthalate) support with a 0.006-inch coating knife at 43° C., and the resulting composition is heated in an air oven for 10 minutes at 96° C.

(A) A portion of the resulting element is exposed for three minutes to a bank of blue fluorescent lights at a distance of one inch through a step tablet having density increments of approximately 0.3 density units. After passing the exposed portion through a hot roll vesicular film developer at 93° C., there are observed four printed steps having specular densities (with a 24° cone collection angle) of 1.88, 1.86, 1.80 and 1.48. The background density is 0.06. These values correspond to a speed of 110 (defined as 1,000 divided by the exposure time, in seconds, required to obtain a density of 1.0). The coating, although orange colored before exposure, is colorless after fixing.

(B) Employing similar procedures, a second sample of the coated element is exposed to black fluorescent light, and after development, four steps are reproduced having densities of 1.88, 1.88, 1.77 and 0.10, with a background density of 0.09, corresponding to a speed of 79.

(C) A third portion of the coated element is exposed to blue lights for 1.5 to 2 minutes through a bond stationery paper bearing printed matter and then heat developed. A sharp and distinct image is obtained.

EXAMPLE 2

Employing procedures and apparatus similar to those described in Example 1, a solution of 0.2 gram of 2-azido-3-chloro-1,4-naphthoquinone, 3.4 grams of "Saran F220," 0.4 gram of "Lucite 41" and 9.7 grams of tetrahydrofuran is prepared, coated on poly(ethylene terephthalate), baked, exposed to blue fluorescent lights and developed. Three steps are reproduced having specular densities of 2.06, 1.09 and 1.30 at a background density of 0.08, corresponding to a speed of 67.

EXAMPLE 3

A solution of 0.30 gram of 2-azido-3-chloro-1,4-naphthoquinone in 1.95 grams of 1,2-dichloropropane is added in small portions, with stirring, to 10 grams of an 80/14/16 weight percent vinylidene chloride/acrylonitrile/acrlyic acid terpolymer latex (30 percent solids) at a pH of 6 and 50° C. After stirring until solvent droplets disappear, the solution is coated on a suitably subbed poly(ethylene terephthalate) support with a 0.006-inch coating knife. The resulting coated element is heated for 10 minutes at 96° C. in an air oven, exposed for 30 seconds to blue fluorescent lights as described in Example 1–A and developed at 100° C. Three steps are reproduced.

EXAMPLE 4

Employing procedures and apparatus similar to that described in Example 1–A, a solution of 0.2 gram of 2-azido - 3 - chloro-5,6-dimethylbenzoquinone, 2.7 grams of "Saran F220," 0.3 gram of "Lucite 41" and 8.0 grams of tetrahydrofuran is coated on poly(ethylene terephthalate), exposed to blue fluorescent lights and developed. Three steps are reproduced having densities of 1.97, 1.97 and 1.64, with a background density of 0.08, corresponding to a speed of 66.

EXAMPLE 5

Employing apparatus and procedures similar to those described in Example 1–A, a solution of 0.2 gram of 2,3-diazido - 6,7 - dimethyl-1,4-naphthoquinone, 3.0 grams of "Saran F220," 0.3 gram of "Lucite 41" and 8.7 grams of tetrahydrofuran is coated on poly(ethylene terephthalate), exposed to blue fluorescent lights and developed. Four steps are reproduced at densities of 1.91, 1.89, 1.83 and 1.20 at a background density of 0.08, corresponding to a speed of 100.

EXAMPLE 6

Employing apparatus and procedures similar to those described in Example 1–A, a solution of 0.22 gram of 2,3 - diazido - 5 - nitro-1,4-naphthoquinone, 3.4 grams of "Saran F220," 0.4 gram of "Lucite 41" and 7.7 grams of tetrahydrofuran is coated on poly(ethylene terephthalate), exposed under blue fluorescent lights and developed. Three steps are reproduced at densities of 2.01, 1.92 and 1.44 and a background density of 0.13, corresponding to a speed of 60.

Example 7

To a stirred solution of 0.7 gram of gelatin in 9.3 grams of water at 40° C., there is added 0.05 gram of 2,3-diazido-1,4-naphthoquinone-6-sulfonic acid sodium salt. The resulting solution is coated on poly(vinyl alcohol)-subbed poly(ethylene terephthalate) with a 0.012 inch coating knife and dried at 50° C. After exposing the element under blue fluorescent lights as described in Example 1–A and developing by heating on a hot block at 100° C. for a few seconds, five steps are reproduced.

The invention has been described above in considerable detail, with particular reference to preferred embodiments thereof, but it will be understood that variations and modifications can be effected within the spirit and scope of the invention as described above and as defined in the appended claims.

We claim:

1. A light-sensitive vesicular composition comprising a thermoplastic polymeric matrix having sufficient impermeability to nitrogen gas to prevent undue loss of the gas before development of the image and having uniformly dispersed therein an amount of a 2-azido-1,4-quinone sufficient to form a vesicular image.

2. A vesicular composition as described in claim 1 wherein the 2-azido-1,4-quinone has the formula:

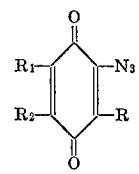

wherein:

(A) R is selected from the group consisting of a hydrogen atom, a halogen atom and an azido radical,
(B) $R_1$ and $R_2$, when taken alone, are each a monovalent substituent selected from the group consisting of a hydrogen atom, a halogen atom, an azido radical, an alkyl radical, an alkoxy radical, an aryl radical, an aryloxy radical, an arylthio radical, a sulfo radical, an alkali metal sulfo radical, and when taken together, a radical which, when taken with the benzoquinone nucleus, forms a 6-membered carbocyclic fused ring.

3. A composition according to claim 1 wherein said quinone is selected from the group consisting of a 2-azido-3-halo-1,4-quinone and a 2,3-diazido-1,4-quinone.

4. A vesicular composition as described in claim 3 wherein the azidoquinone has the formula:

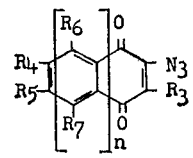

wherein:

(A) $R_3$ is a monovalent substituent selected from the group consisting of a halogen atom and an azido radical,
(B) $n$ is an integer having a value of from 0 to 1,
(C) each of $R_4$, $R_5$, $R_6$ and $R_7$, when the value of $n$ is 1, is a monovalent substituent selected from the group consisting of a hydrogen atom, an alkyl radical, an alkoxy radical, an aryl radical, an aryloxy radical, an arylthio radical, a sulfo radical and an alkali metal sulfo radical, and (D) each of $R_4$ and $R_5$, when the value of $n$ is 0, is a monovalent substituent selected from the group consisting of a halogen atom and an azido radical.

5. A vesicular composition as described in claim 4 wherein $R_3$ is a monovalent substituent selected from the group consisting of chlorine and an azido radical; and each of $R_4$, $R_5$, $R_6$ and $R_7$ is a monovalent substituent selected from the group consisting of a hydrogen atom and a lower alkyl radical.

6. A vesicular composition as described in claim 5 wherein $R_3$ is chlorine.

7. A vesicular composition as described in claim 5 wherein $R_3$ is azido.

8. A vesicular composition as described in claim 5 wherein $n$ is 1.

9. A photographic element comprising a support having coated thereon a light-sensitive layer comprising a vesicular composition as described in claim 1.

10. A photographic element comprising a polymeric photographic film support having coated thereon a vesicular composition having sensitivity in the range of about 300 to 500 m$\mu$., said vesicular composition comprising a thermoplastic polymer having incorporated therein about 2 to 20 percent of an azido-quinone based on the weight of the vesicular composition, and said azidoquinone being selected from the group consisting of:

2,3-diazido-1,4-naphthoquinone,
2-azido-3-chloro-1,4-naphthoquinone,
2-azido-3-chloro-5,6-dimethylbenzoquinone,
2,3-diazido-6,7-dimethyl-1,4-naphthoquinone,
2,3-diazido-5-nitro-1,4-naphthoquinone, and
2,3-diazido-1,4-naphthoquinone-6-sulfonic acid sodium salt.

11. A photographic element as described in claim 10 wherein the film support is poly(ethylene terephthalate).

12. A photographic element as described in claim 10 wherein the thermoplastic polymer is selected from the group consisting of:
  (A) at least one of copoly(vinylidene chloride-acrylonitrile) and poly(methyl methacrylate),
  (B) terpoly(vinylidene chloride-acrylonitrile - acrylic acid), and
  (C) gelatin.

References Cited
UNITED STATES PATENTS

| | | | |
|---|---|---|---|
| 2,844,595 | 7/1958 | Waisbrot | 260—349 XR |
| 2,865,932 | 12/1958 | MacMullen | 260—349 |
| 3,137,745 | 6/1964 | Johnstone | 260—2.5 XR |
| 3,143,418 | 8/1964 | Priest et al. | 96—91 XR |
| 3,355,295 | 11/1967 | Priest | 96—91 |
| 3,387,004 | 6/1968 | Mosby et al. | 260—349 |

NORMAN G. TORCHIN, Primary Examiner

C. BOWERS, Assistant Examiner

U.S. Cl. X.R.

96—49, 75, 87; 260—2.5, 349